United States Patent
Zhang

(10) Patent No.: US 10,880,095 B2
(45) Date of Patent: *Dec. 29, 2020

(54) ELECTRONIC APPARATUS, METHOD FOR ELECTRONIC APPARATUS AND INFORMATION PROCESSING SYSTEM

(71) Applicant: Sony Corporation, Tokyo (JP)

(72) Inventor: Zhihui Zhang, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/507,029

(22) Filed: Jul. 10, 2019

(65) Prior Publication Data

US 2019/0334728 A1    Oct. 31, 2019

Related U.S. Application Data

(63) Continuation of application No. 15/419,223, filed on Jan. 30, 2017, now Pat. No. 10,396,999.

(51) Int. Cl.
| | |
|---|---|
| *H04L 29/06* | (2006.01) |
| *H04L 9/32* | (2006.01) |
| *H04L 9/06* | (2006.01) |
| *H04L 9/30* | (2006.01) |
| *H04L 29/08* | (2006.01) |

(52) U.S. Cl.
CPC .......... *H04L 9/3247* (2013.01); *H04L 9/0643* (2013.01); *H04L 9/30* (2013.01); *H04L 9/3236* (2013.01); *H04L 9/3239* (2013.01); *H04L 67/104* (2013.01); *H04L 2209/38* (2013.01)

(58) Field of Classification Search
None
See application file for complete search history.

(56) References Cited

U.S. PATENT DOCUMENTS

| | | |
|---|---|---|
| 9,635,000 B1 | 4/2017 | Muftic |
| 9,875,510 B1 | 1/2018 | Kasper |
| 10,158,480 B1 * | 12/2018 | Winklevoss ........ H04L 12/2803 |
| 2014/0283031 A1 | 9/2014 | Eksten et al. |
| 2015/0269570 A1 | 9/2015 | Phan et al. |
| 2015/0310424 A1 | 10/2015 | Myers |
| 2016/0028552 A1 | 1/2016 | Spanos et al. |
| 2016/0098723 A1 | 4/2016 | Feeney |
| 2016/0162897 A1 | 6/2016 | Feeney |
| 2016/0191243 A1 | 6/2016 | Manning |
| 2016/0253622 A1 | 9/2016 | Sriram |
| 2016/0253663 A1 | 9/2016 | Clark et al. |
| 2016/0292672 A1 | 10/2016 | Fay et al. |
| 2016/0330034 A1 | 11/2016 | Back et al. |
| 2017/0083860 A1 * | 3/2017 | Sriram ................ H04L 63/0823 |

(Continued)

*Primary Examiner* — Maung T Lwin
(74) *Attorney, Agent, or Firm* — Xsensus LLP

(57) ABSTRACT

An electronic apparatus, a method for an electronic apparatus and an information processing system are provided. The electronic apparatus includes a processing circuit configured to: generate a request to be confirmed which is to be sent to other nodes in a network, the request to be confirmed including an electronic signature of the present node; acquire responses to the request to be confirmed which are from the other nodes, the response including an electronic signature of a corresponding node; and generate, based on the request to be confirmed, the acquired response and an existing block chain, a new block.

22 Claims, 7 Drawing Sheets

(56) References Cited

U.S. PATENT DOCUMENTS

| | | |
|---|---|---|
| 2017/0140394 A1 | 5/2017 | Cao et al. |
| 2017/0228731 A1 | 8/2017 | Sheng et al. |
| 2017/0295180 A1* | 10/2017 | Day .................. G07C 9/28 |
| 2017/0344435 A1 | 11/2017 | Davis |
| 2017/0344987 A1 | 11/2017 | Davis |

* cited by examiner

ELECTRONIC APPARATUS, METHOD FOR ELECTRONIC APPARATUS AND INFORMATION PROCESSING SYSTEM

CROSS-REFERENCE TO RELATED APPLICATIONS

This application is a continuation of U.S. application Ser. No. 15/419,223, filed Jan. 30, 2017, and claims priority to CN 201610365995.0, filed May 27, 2016, the entire contents of each are incorporated herein by reference.

FIELD OF THE INVENTION

Embodiments of the present disclosure generally relate to the field of information processing, in particular to information security technologies, and more particular to an electronic apparatus, a method for an electronic apparatus and an information processing system.

BACKGROUND OF THE INVENTION

In the computer science, a hash function is also referred to as a hashing function, which is used to convert different information with any length, such as numbers, texts or other information, into binary sequences with the same length but different content. Taking the SHA 256 algorithm as an example, input information with any length can be converted into a group of binary sequences with a length of 256 by the function, so as to be stored and identified uniformly. In addition, a probability that the same digital output is generated by the SHA256 from any two pieces of different input information is very little, since tiny change on the input information will result in great change on the output numbers. This ensures that there is a one-to-one-correspondence between the input information and the output numbers. In addition, it is quite difficult to deduce the input information from the output numbers. Therefore, if a particular output number is to be generated, only forward calculation one by one using a method of trying randomly can be adopted, and the input information can not be deduced from the output result reversely.

Peer to Peer (P2P) calculation may be simply defined as sharing computer resources and services by direct exchanging, and a network formed by an application layer of a P2P calculation model is generally referred as a P2P network. In a P2P network environment, thousands of computers connected to each other are peers, and generally the whole network does not need a dedicated centralized server.

In addition, during a process of information transferring, a public key infrastructure (referred to as PKI for short) may be used to ensure information security. Specifically, a sender encrypts information using a key; after receiving the information, a receiver decrypts the information using another paired key, thereby ensuring privacy and security during the information transferring process. The key may be a group of numbers or characters. The original information is converted into another format by performing a specific operation on the original information and the group of numbers or characters, thereby achieving encryption. The decryption process is just opposite. In most cases, a group of keys are consisted of a public key and a private key. The private key is maintained personally, and the pubic key needs to be public to others. During the process of information transferring, the public key and the private key cooperate with each other, such that an identity of a sender holding the private key can be verified, and the sender can not deny the information sent by itself. Further, the integrity of transceiving information can be ensured, and the information is prevented from being intercepted and tampered during transmission. If the public key is lost, the public key can be recovered by the private key. However, it is impossible to deduce the private key from the public key theoretically, thereby ensuring privacy of the private key.

A concept of block chain is initially applied by Satoshi Nakamoto to the bitcoin technology which he proposed. The bitcoin is a digital currency in a form of P2P. P2P transmission means a decentralized payment system. In the bitcoin economy, all transaction behaviors are confirmed and recorded using a distributed database composed of many nodes in the whole P2P network, and a design of cryptology (such the hash function and the public key infrastructure described above) is used to ensure security during respective segments of currency circulation. The characteristic of decentralization of P2P and the algorithm itself can ensure that currency values can not be manipulated manually by manufacturing a great number of bitcoins. The design based on cryptology can ensure that the bitcoins can be transferred or paid only by the real holders. This also ensures anonymity of currency ownership and circulation transaction. The block chain is composed of a series of data blocks generated by a cryptology method, each block contains a hash value of a last block, and a current block is linked from an initial block, so as to form the block chain. It is ensured that each block is generated after the last block in a time order; otherwise the hash value of the last block is unknown. The block chain is extended continuously, and a new block would not be removed once added to the block chain. The block chain is actually a distributed database maintained by the whole P2P network platform, i.e., all participating client nodes, which records the whole transaction history of bitcoins.

Since each participating node in the network stores a copy of the block chain, it is essentially impossible to lose or tamper the block chain completely.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the present disclosure, an electronic apparatus is provided, which includes a processing circuit configured to: generate a request to be confirmed which is to be sent to other nodes in a network, the request to be confirmed including an electronic signature of the present node; acquire responses to the request to be confirmed which are from the other nodes, the response including an electronic signature of a corresponding node; and generate, based on the request to be confirmed, the acquired responses and an existing block chain, a new block.

According to another aspect of the present disclosure, an electronic apparatus is provided, which includes a processing circuit configured to: generate a response to a request to be confirmed from another node in a network, for use by the other node to generate a new block, the request to be confirmed including an electronic signature of the other node and the response including an electronic signature of the present node.

According to another aspect of the present disclosure, a method for an electronic apparatus is provided, which includes: generating a request to be confirmed which is to be sent to other nodes in a network, the request to be confirmed including an electronic signature of the present node; acquiring responses to the request to be confirmed which are from the other nodes, the response including an electronic signature of a corresponding node; and generating, based on the request to be conformed, the acquired responses and an existing block chain, a new block.

According to another aspect of the present disclosure, a method for an electronic apparatus is provided, which includes: generating a response to a request to be confirmed from another node in a network, for use by the other node to generate a new block, the request to be confirmed including an electronic signature of the other node and the response including an electronic signature of the present node.

According to another aspect of the present disclosure, an information processing system is provided, which includes multiple nodes communicating with each other via a P2P network, where each of the multiple nodes is configured to: generate a request to be confirmed which is to be sent to other nodes in a network, the request to be conformed including an electronic signature of the present node; acquire responses to the request to be confirmed which are from the other nodes, the response including an electronic signature of a corresponding node; and generate, based on the request to be conformed, the acquired responses and an existing block chain, a new block; and/or each of the multiple nodes is configured to: generate a response to a request to be confirmed from another node in the network, for use by the other node to generate a new block.

According to other aspects of the present disclosure, there are also provided computer program codes and computer program products for implementing the above mentioned method for an electronic apparatus as well as a computer readable storage medium in which computer program codes for implementing the above mentioned method for an electronic apparatus are recorded.

According to the embodiment of the present disclosure, a new block including credible and useful information is generated based on the request and the response, and trust is transferred among different nodes using a block chain, thereby achieving sharing of credible information.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF THE EMBODIMENTS

Figure 1:
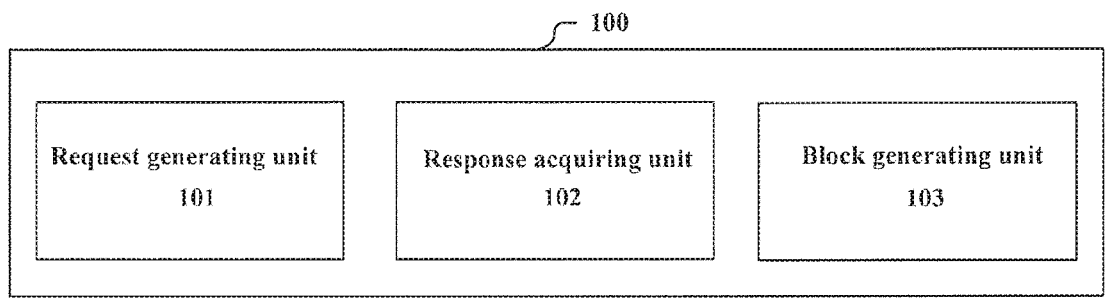
FIG. 1 shows a block diagram of functional modules of an electronic apparatus according to an embodiment of the present disclosure.

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

First Embodiment

As described above, the block chain technology has a characteristic of creating and transferring trust. Therefore, the block chain technology may adapt to any application in which respective strange nodes without a trust relationship cooperate with each other, although the present application is generally limited to the field of finance.

In a bitcoin system, a new block is generated by a mining operation of a miner. The mining is a process in which a work load is proved using a stochastic number. The process solves a trust problem in the interne, and is a credit proof in an unreliable network environment. The mining refers to a process of generating a new block and calculating a stochastic number. Specifically, for a certain node on the network for example a computer, the mining includes the following steps: calculating a hash value by the computer by taking content of a last block of its stored block chain as the input; after receiving the broadcasted transactions and checking accuracy of the transactions one by one, combining the transactions which are not listed in the existing blocks and incorporating into a new block by the computer; guessing a stochastic number by the computer randomly; inputting the data generated in the previous three steps into an SHA256 hash function by the computer, so as to calculate a binary number with a length of 256; checking whether the previous n bits of the binary number meet a requirement (i.e., a difficulty target) by the computer; and broadcasting, by the computer, the new block to other nodes on the network together with the lucky stochastic number, if the binary number meets the requirement. After receiving the new block, the other nodes perform check in a similar way. If the result is correct, the whole network accepts the new block, and stores the new block together with the previous block chain. On the other hand, if the generated stochastic number does not meet the requirement, steps after the second step are repeated, until the computer itself generates a new block successfully or receives a new block transmitted by other nodes.

It may be seen that, in the block chain system of bitcoins, calculation power is wasted severely. Therefore, it is not suitable for an application scenario with a poor calculation capability or a high real-time requirement. In addition, content included in the block is transaction information between different owners, and therefore a whole block itself can not be transferred or transacted as an independent property, or the block itself does not have an independent meaning.

In the embodiment, a technology for generating a block based on a request and a response is provided. FIG. 1 shows a block diagram of functional modules of an electronic apparatus 100 according to an embodiment of the present disclosure. The electronic apparatus 100 includes: a request generating unit 101, configured to generate a request to be confirmed which is to be sent to other nodes in a network, the request to be confirmed including an electronic signature of the present node; a response acquiring unit 102, configured to acquire responses to the request to be confirmed which are from other nodes, the response including an electronic signature of a corresponding node; and a block generating unit 103, configured to generate, based on the request to be confirmed, the acquired responses and an existing block chain, a new block.

A node where the electronic apparatus 100 is located is referred as the present node. The node described in the present disclosure may be any network device in a communication network, which includes but not limited to a computer terminal, a server, a router and so on. Information is transferred between respective nodes over a P2P network. The P2P network may be a fixed network, or a dynamic self-organized network such as Ad Hoc or the like.

Each node may be freely accessed to a block chain platform to generate a new block, for example, freely downloading an application (a client) of a corresponding block chain and running the application. Practically, a certain threshold may be set to limit accessing of nodes. The threshold may be an extra condition such as obtaining certain permission, the computation capability or the like.

With the above electronic apparatus 100, the present node functions as an initiating node. The request generating unit 101 generates a request to be conformed by other nodes in response to an operation of a user and so on for example, where the request to be confirmed includes an electronic signature of the present node.

The electronic signature is used, such that other nodes can confirm an identity of the initiating node and that the initiating node admits the content of the request to be confirmed. The electronic signature may be implemented by any authentication technology. As an example, the request generating unit 101 may encrypt the request to be confirmed using a key allocated to the present node in a public key system, so as to obtain an electronic signature. The key may be preset or may be generated when accessing to the block chain platform.

After receiving the request to be confirmed, each of the other nodes makes response to the request to be confirmed, for example according to priori knowledge of the corresponding node or real-time context data, and attaches an electronic signature of the corresponding node in the response. How to make a response depends on specific applications. Similarly, the electronic signature enables the initiating node to confirm, after receiving the response, an identity of the node making the response and that the node admits the content of the response.

The response acquiring unit 102 acquires responses from other nodes, and the block generating unit 103 generates a new block using the request to be conformed and the acquired responses, on the basis of the existing block chain. In an example, the block generating unit 103 generates the new block only when the acquired responses satisfy a predetermined condition. When the predetermined condition is not satisfied or other nodes do not make a response or respond by rejecting, the block generating unit 103 performs no operation. For example, the block generating unit 103 generates the new block only when the number of the acquired responses is large enough, for example, when above ⅔ of the nodes make responses. Alternatively, the block generating unit 103 generates the new block only when the number of nodes making positive responses exceeds a predetermined number. The predetermined condition may be set depending on an actual application scenario and/or an object to be realized.

The block generating unit 103 may generate the following new block. The new block includes a block header and a data body, and the block header includes a timestamp, a hash value of a last block in the existing block chain, a hash value of the new block and a hash value of the data body. Each node would store a copy of the block chain. The block generating unit 103 may acquire the last block in the existing block chain by reading the copy. The new block is linked to the existing block chain by the hash value of the last block in the existing block chain included in the new block.

Figure 2:
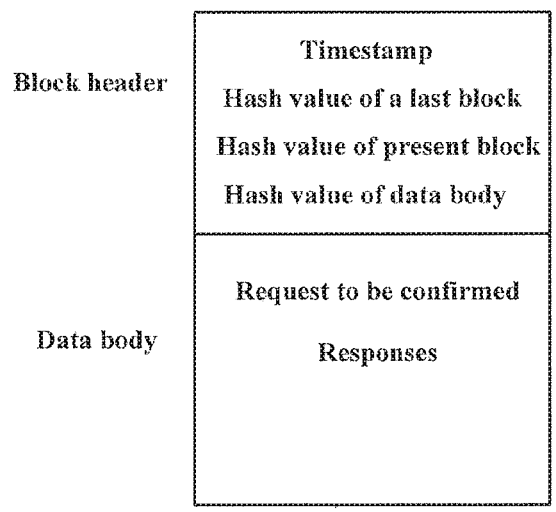
FIG. 2 shows a schematic diagram of a structure of a block according to an embodiment of the present disclosure.

In an example, the data body includes the request to be confirmed and the responses. As described above, the request to be confirmed and the responses each include an electronic signature of a respective node. FIG. 2 shows a schematic diagram of an example of a block according to the embodiment.

Figure 3:
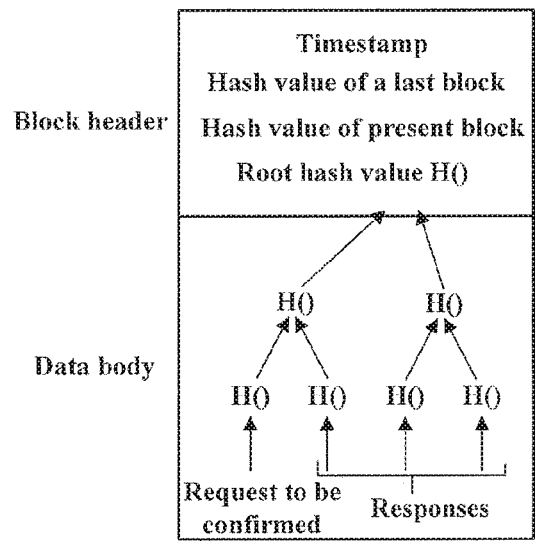
FIG. 3 shows a schematic diagram of a structure of a block according to an embodiment of the present disclosure.

Schematically, in order to facilitate storing, information of the data body may be stored in a tree hash structure such as a Merkle tree. FIG. 3 shows a schematic diagram of an example of a block using the Merkle tree. It may be seen that, in the example, the request to be confirmed and respective responses each are a leaf node of the tree hash structure. A root hash value of the Merkle tree is stored in the block header as the hash value of the data body. Practically, the content of the data body may be stored using a list, and in this case the hash value of the data body is directly obtained from the content of the listed data body. It should be understood that, the above description is only exemplary, and the storage manners of the block are not limited thereto.

Figure 4:
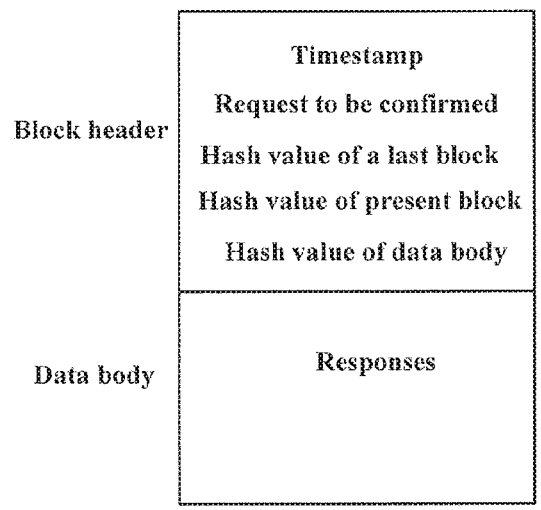
FIG. 4 shows a schematic diagram of a structure of a block according to an embodiment of the present disclosure.
Figure 5:
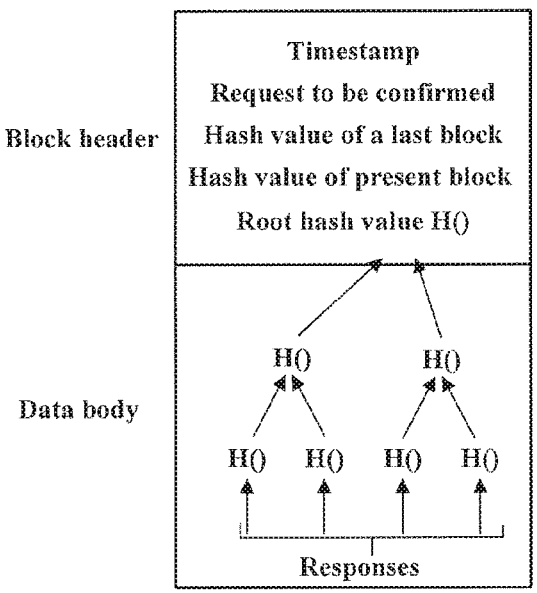
FIG. 5 shows a schematic diagram of a structure of a block according to an embodiment of the present disclosure.

In addition, in order to facilitate an operation of an application layer, the request to be confirmed may also be included in the block header. In this way, the application layer may acquire the content related to the block by directly reading the block header. In this case, the data body only includes the response. FIG. 4 shows a schematic diagram of a block in the example. Information of the data body may still be stored in the tree hash structure, such as the MerKle tree. FIG. 5 shows a schematic diagram of an example of a block using the Merkle tree.

It should be noted that, the generation of the new block described above is just an example. The block generating unit 103 may generate a new block using other ways to share the information. For example, in the case of using a block chain platform with a token, the block generating unit 103 may further bind the request to be confirmed and the responses on a virtual currency to share using the technology similar to a colored coin.

After generating the new block, the node broadcasts the new block in a network, such that other nodes can verify the new block and thus update the block chain. Therefore, in the embodiment, the electronic apparatus 100 generates a new block by transmitting the request to be confirmed and receiving the responses. Since the request to be confirmed and the responses each include the electronic signature of the respective node, unnecessary calculation power consumption is reduced while ensuring that the new block is based on trust. The generated new block includes the request to be confirmed and the responses thereof, and the block itself can be exchanged and transferred as a property, thereby sharing the information.

In addition, any participating nodes may obtain reward, thereby reflecting fairness. For example, in order to drive all nodes to participate in maintenance of the block chain, some reward measures may be provided. For example, a request to be confirmed transmitted by a node with high points may be processed by other nodes first; each node generating a new block would obtain bonus points; every time verifying the request to be confirmed, a node in charge of the verification would also obtain bonus points, and signature information of the node performing the verification also appears in the new block; and so on.

Respective units in the electronic apparatus 100 may be implemented by one or more processing circuits for example, and the one or more processing circuits may be implemented as a chip for example.

Second Embodiment

Figure 6:
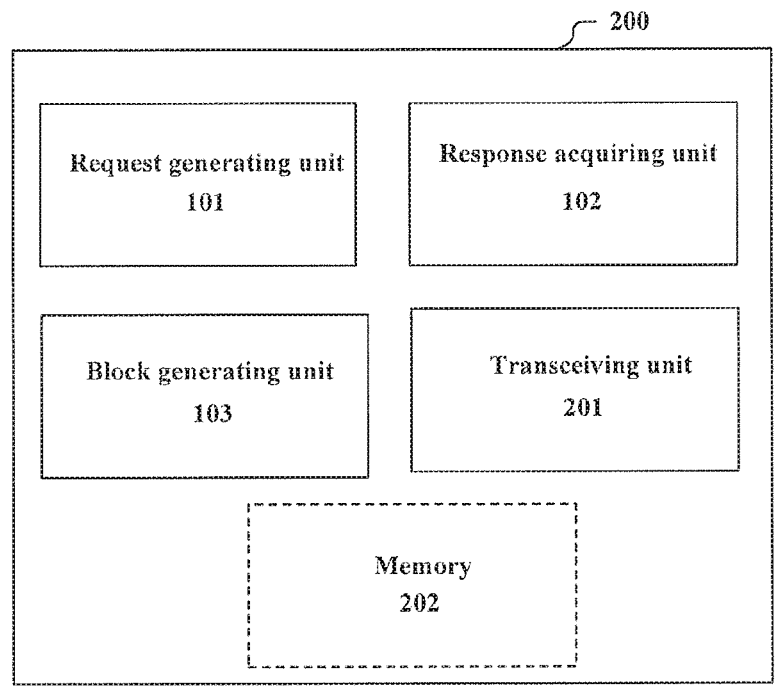
FIG. 6 shows a block diagram of functional modules of an electronic apparatus according to an embodiment of the present disclosure.

FIG. 6 shows a block diagram of functional modules of an electronic apparatus 200 according to another embodiment of the present disclosure. Besides the respective units described by referring to FIG. 1, the electronic apparatus 200 further includes: a transceiving unit 201, configured to broadcast the generated new block to each of the other nodes in the network so as to update the block chain.

In addition, the transceiving unit 201 is further configured to transmit the request to be confirmed to other nodes in the network and receive responses from the other nodes.

According to the block chain technology, the block chain in stored on the network in a distributed manner. Therefore, after a new block is generated, the new block needs to be recognized by the other nodes, such that the new block is attached to the end of a copy of the stored block chain.

After receiving the new block, each of the other nodes on the network verify the new block, for example verifying at least one of the following items: the hash value of the block, the hash value of a previous block included in the block, the hash value of a data body, and legitimacy of respective electronic signatures in the data body and so on. When the verification passes, the new block is attached to the end of the copy of the block chain stored by the node. On the other hand, there is a possibility that the new block is rejected by other nodes due to a conflict, verification failure or the like.

In an example, the block generating unit 103 is further configured to regenerate, based on the request to be confirmed, the received responses and the updated block chain, a new block, when the generated new block is rejected by other nodes. For example, when the new block is rejected by nodes on the network since the new block conflicts with a new block generated by another node substantially at the same time, the block chain is updated since other nodes on the network accept the new block generated by the other node, that is, the new block generated by the other node is attached to the end of the copy of the block chain stored by each node. In this case, the present node may regenerate a new block using the existing request to be conformed and responses. However, the last block of the block chain changes, a hash value thereof changes accordingly and a timestamp should be updated. Therefore, the block generating unit 103 needs to recalculate a hash value of the new block. Since the updating of the block chain is based on a consensus of all nodes on the network, in this case, an initiating node may find that its broadcasted new block is rejected after updating the stored block chain.

Practically, the block generating unit 103 may determine whether to regenerate a new block further depending on an operation of the initiating node and validity of the response information. For example, in the case that the initiating node already cancels the operation of generating a new block, the block generating unit 103 does not need to regenerate a new block.

In addition, in some applications with high real-time requirements, information of the responses generally has time limitation. Therefore, it is equivalent to that a valid time window for generating a new block is set. Once the valid time window is expired, no new block can be generated using the information of the responses. In this case, it needs to retransmit a request to be confirmed and reacquire responses, so as to generate a new block. Therefore, the block generating unit 103 is further configured to regenerate a new block only when the response the information of the responses is still valid.

Figure 7:
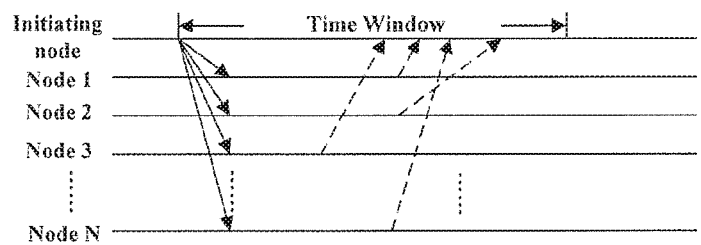
FIG. 7 shows a schematic diagram of an example of a time window.

In addition, after the initiating node transmits the request to be confirmed, a time window may be started, and responses from the other nodes are received within the time window. As shown in FIG. 7, a solid line with an arrow indicates the broadcasted request to be confirmed, a dotted line with an arrow indicates a response, and a direction of the arrow indicates a direction of data transfer. In this example, the transceiving circuit 201 is configured to receive the responses within a predetermine time period (i.e., the time window) since the request to be confirmed is transmitted.

Respective units in the electronic apparatus 200 may be implemented by one or more processing circuits for example, and the one or more processing circuits may be implemented as a chip for example. In addition, the transceiving unit 201 may also be implemented by a transceiving circuit, a communication interface, an antenna and so on.

Third Embodiment

Figure 8:
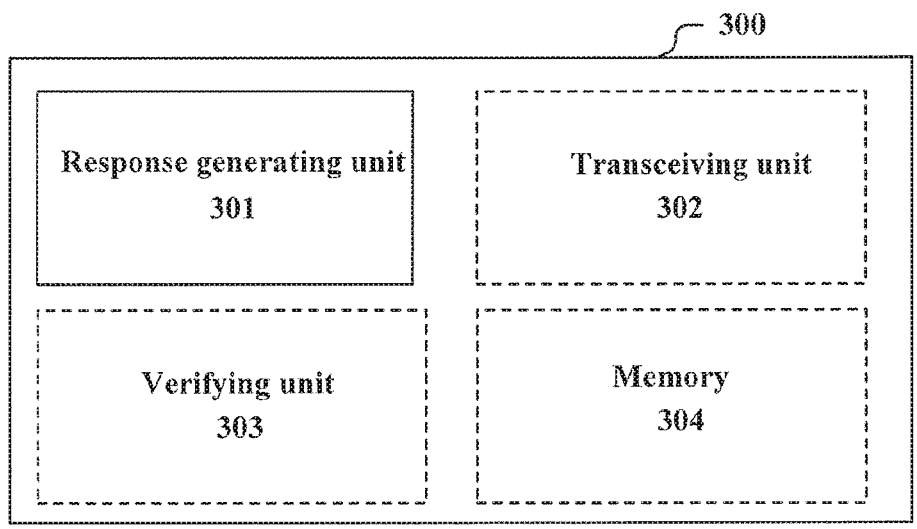
FIG. 8 shows a block diagram of functional modules of an electronic apparatus according to an embodiment of the present disclosure.

FIG. 8 shows a block diagram of functional modules of an electronic apparatus 300 according to another embodiment of the present disclosure. As shown in FIG. 8, the electronic apparatus 300 includes: a response generating unit 301, configured to generate a response to a request to be confirmed from another node in a network, for use by the other node to generate a new block, where the request to be confirmed includes an electronic signature of the other node and the response includes an electronic signature of the present node.

It should be understood that, with the electronic apparatus 300, a node corresponding to the electronic apparatus 300 (referred to as the present node) can make a response to the request to be confirmed from the other node, the response is a reply to the request to be confirmed and indicates views of the present node or information which the present node can provide, such that the initiating node can generate a new block at least based on the response. The request to be confirmed and the response each include an electronic signature of a respective node, the information may be considered to be credible, therefore the generated new block can transfer trust between respective nodes.

In an example, the response generating unit 301 makes a response according to priori knowledge of the present node or real-time context data. Specific operation ways of the response generating unit 301 depend on specific applications. In addition, the response may further include information of time limitation for indicating a period of time during which the response is valid. For example, in a scene with a strong real-time requirement, the validity of the response may be ensured by the information of time limitation.

As shown by a dotted line block in FIG. 8, the electronic apparatus 300 may further include: a trnasceiving unit 302, configured to receive a request to be confirmed and transmit the generated response to the other node. The transceiving unit 302 may be implemented by a transceiving circuit, a communication interface, an antenna and so on for example.

After the transceiving unit 302 receives the request to be confirmed from the initiating node, the response generating unit 301 may verify the electronic signature in the request to be confirmed, to confirm an identity of the transmitting node and the validity of the request to be confirmed, and then generate a response using its electronic signature. The transceiving unit 302 transmits the response to the initiating node. As described above, the response would be used by the initiating node to generate a new block.

In an example, the transceiving unit 302 may be further configured to receive a new block broadcasted by another node. As shown by another dotted line block in FIG. 8, the electronic apparatus 300 may further include: a verifying unit 303, configured to verify the received new block, and attach the new block to the end of a copy of the block chain stored by the present node after the verification passes. Accordingly, the electronic apparatus 300 may further include a memory 304 for storing the copy of the block chain.

As described above, the verification performed by the verifying unit 303 may include verifying at least one of the following items: a hash value of the new block, a hash value of a previous block included in the new block, a hash value of a data body in the new block, and legitimacy of respective electronic signatures in the data body and so on. If the verification fails, the verifying unit 303 would reject the new block, thereby not updating the copy of the block chain stored by the present node.

In addition, the verifying unit 303 is further configured to select the earliest generated new block according to information of timestamps in the new blocks, when the transceiving unit 302 receives two or more broadcasted new blocks at the same time. That is, there exists a case that the transceiving unit 302 receives two or more new blocks from different initiating nodes at the same time instant, but the timestamps in these new blocks are not necessarily the same. In this case, the verifying unit 303 may select a new block in which the timestamp indicates an earliest time instant to perform verification. Particularly, if the two or more new blocks received simultaneously have the same timestamp, the verifying unit 303 may select one new block randomly. Actually, as for the new blocks with the same timestamp, due to factors such as a link configuration of the network, different nodes may receive these new blocks in different timings, and the node may process the earliest received new block according to a principle of "first come first served". In this case, the block chain system would automatically reject the discarded blocks.

Respective units in the electronic apparatus 300 may be implemented by one or more processing circuits for example, and the processing circuit may be implemented as a chip for example.

With the electronic apparatus 300 according to the embodiment, the block chain can be updated with the calculation power saved.

In the above description, actually an information processing system is further provided, which includes multiple nodes communicating with each other via a P2P network, where each of the multiple nodes is configured to: generate a request to be confirmed which is to be sent to other nodes in a network, the request to be confirmed including an electronic signature of the present node; acquire responses to the request to be confirmed which are from the other nodes, the response including an electronic signature of a corresponding node; and generate, based on the request to be confirmed, the acquired response and an existing block chain, a new block, and/or each of the multiple nodes is configured to: generate a response to a request to be confirmed from another node in a network, for use by the other node to generate a new block.

That is, a node in the information processing system may include the electronic apparatus 300 and at least one of the electronic apparatus 100 and 200, such that the node may function as not only the initiating node but also a response node providing a response. Alternatively, the node may include only the electronic apparatus 100 or 200, or include only the electronic apparatus 300, such that the information processing system includes two types of nodes.

Fourth Embodiment

Operations and functions of the electronic apparatus 100 to the electronic apparatus 300 are further described in combination with specific application scenarios in the embodiment.

First Application Example

In this example, the network is Internet of Vehicle (IoV). IoV is an application of Internet of Things in a vehicle field, an only road for the mobile internet and the Internet of Things to develop towards service essence and in depth, and is a fusion technology of information communication, environment protection, energy saving, security and so on in the future. The IoV refers to interactions between a vehicle and a vehicle, between a vehicle and a road, between a vehicle and a person, between a vehicle and a sensor, and so on, thereby achieving a dynamic mobile communication system in which the vehicle communicates with the public through the network. The IoV can share information through interconnection and inter-communication between a vehicle and a vehicle, between a vehicle and a person and between a vehicle and a road, guide and regulate vehicles effectively according to different function requirements, and provide a professional multi-media and mobile internet application service. With the IoV technology, the vehicle can achieve V2V (vehicle to vehicle) communication, share data between the going and coming vehicles in a real-time manner, and achieve V2X (vehicle to road infrastructure) communication.

By applying the electronic apparatus of the present disclosure to a vehicle (i.e., a node), trust can be transferred between uncorrelated entities using the block chain technology, and real and valid real-time road conditions information is obtained in real-time according to the consensus. In this way, decentralized real-time road conditions observation and further a navigation system may be realized.

It should be understood that, the road conditions information is specific to a certain region and changes in a real-time manner. Therefore, the block chain system in this application scenario is a regional and dynamic block chain system. A corresponding client device may be equipped on the vehicle to operate and maintain the block chain. Exemplarily, the client device may include the electronic apparatus described above.

Specifically, when a vehicle serving as an initiator is to transmit a request for road conditions information, the request generating unit 101 of the electronic apparatus generates a request to be confirmed including an electronic signature of the vehicle and transmits the request to be confirmed to other vehicles through V2V communication for example.

In an example, the request to be confirmed includes geographical location information and traffic conditions information at a corresponding geographical location. For example, the initiating vehicle observes road traffic conditions at a geographical location where the initiating vehicle is located to obtain an observation result whether there is a traffic jam for example, and the observation result would be included in the request to be confirmed. The vehicle may observe the road traffic conditions by means of at least one of the followings: analyzing a shooting result of a camera, a sensing result of an on-board sensor such as a speed sensor, and a record of braking cases and so on.

Another vehicle which receives the request to be confirmed may obtain an observation result of a current traffic conditions using similar observation ways, and thus make a response to the request to be confirmed based on the observation result. Subsequently, the electronic apparatus on the vehicle adds an electronic signature to the response and replies to the initiator. It should be understood that, the road traffic conditions information is information with strong time limitation, and thus the response may further include information of time limitation.

When the initiator receives enough responses within a predetermined time window, the initiator may generate a new block. The operation of generating the new block may be performed by the block generating unit 103 of the electronic apparatus, and the new block may be constructed by the ways in the first embodiment described above, which is not repeated here. In addition, in the case of using a block chain platform with a token, the block generating unit 103 may also bind the road traffic conditions information on a virtual currency to share, using the technology similar to a colored coin.

Subsequently, the initiator broadcasts the generated new block to other vehicles, so as to wait confirmation from the other vehicles. If the new block is accepted, the new block becomes the last block of the block chain at a current time instant.

The vehicle drives in different regions, dynamically joins in and exits from different dynamic block chain systems, and shares data of the block chain with other going and coming vehicles during driving, i.e., shares content of the dynamic block chain for different regions where the vehicles pass, thereby sharing the complete traffic conditions of the area via the IoV in the case that the IoV is non-central. Furthermore, the road traffic conditions data of each vehicle may be shared to a service platform or block chain in an upper level using the V2X technology, so as to achieve the observation of real-time road traffic conditions of the whole area.

On the other hand, the vehicle may achieve real-time road traffic conditions observation and navigation based on the shared data.

Second Application Example

In this example, the block chain may be applied in the field of education. In this example, the block chain, which is a trust chain, may be used to store information such as education experiences, certificates and so on of a user. The information contains, for example, studying which courses and possessing which certificates. In addition, based on concepts of a smart contract and a smart property, knowledge may also be exchanged, transacted and transferred via the block chain as a property.

In the example, a node may be a student, a teacher or a certificate authority having education qualification. For example, when the student finishes a course or obtain a certificate, he/she may function as an initiating node to create a new block to store his/her education experiences. The initiating node may include the electronic apparatus described above for example.

Specifically, the request generating unit 101 generates a request of education experiences to be conformed, where the request includes an electronic signature of the initiating node. The education experiences to be confirmed may attach a certificate number which is to be confirmed by other nodes, or may be an electronic certificate with an electronic signature of a license issuing authority, so that the other nodes can verify the electronic signature. The initiating node may also start a time window simultaneously when transmitting the request.

After receiving the above request, the other nodes verify validity of the education experiences to be confirmed. For example, the verification may be implemented by verifying the validity of the certificate attached to the education experiences, or by verifying the digital signature of the license issuing authority. If the verification passes, recognization information is returned and an electronic signature of a respective node is attached.

If the initiating node receives enough responses before the time window is closed, for example ⅔ of all on-line nodes make responses that the verification passes, the initiating node may use the block generating unit 103 to generate a new block. The new block may include the request of education experiences to be confirmed and responses information of other nodes. Composition of the new block is described in detail previously, and only the information of the data body to be included in the new block is different here. Therefore the composition of the new block is not repeated here.

Subsequently, the initiating node broadcasts the new block to update a block chain. Specifically, another node receives the new block, and attaches the new block to the end of the stored copy of the block chain if the verification passes.

In this way, education experiences of each student can be found in the block chain. When the student provides the education experience information, the student may attach corresponding block chain information and block address information, so as to be verified by a third party.

In addition, besides the education experiences, knowledge obtained by an individual may be transferred as a digital property, similar to the smart property. For example, the consensus may be reached in the block chain each for learning review, learning notes, a particular solution to a certain difficulty, a new created song, a new poem and so on. It should be understood that, in this application scenario, human intervention may be required. For example, people determine whether to accept the new song or the new poem as a new digital property by voting via the block chain.

In this case, the request to be confirmed is knowledge information and is attached with an electronic signature of the initiating node. A time window is started simultaneously when the request to be conformed is transmitted, and the request is to be conformed by other nodes within the time window. In this case, human intervention may be involved, and therefore the time window may be set to have an appropriate length.

After receiving the request, other nodes verify validity of the information to be confirmed. The verification may be by human judgment or by intelligent identification via a computer. If the node recognizes the request to be confirmed, recognition information is returned with an electronic signature of the node attached.

If the initiating node receives enough responses before the time window is closed, the initiating node may create a new block, where the new block includes the request to be confirmed and responses information of other nodes. The initiating node broadcasts the new block to update the block chain. Specifically, another node receives the new block, and attaches the new block to the end of the stored copy of the block chain if the verification passes.

Information of the knowledge in the request to be confirmed may include all content, an abstract or a part of information of the knowledge, as long as the other nodes can be made to believe that the possessed knowledge is valuable.

In this way, the possessor of each block may provide block address information for retrieval. In addition, content of the block may be transferred, for example exchanging learning review or performing transaction.

On the other hand, in the case of combining with the reward mechanism described in the first embodiment, bonus points of each node may be used to improve a priority level, exchange for learning notes and solutions for the problem, or the like. Education mechanism nodes on the block chain need to participate during the exchange. Actually, the block may be transacted by directly using the virtual currency, and money may be used to exchange for points and the points are used to purchase block information.

Fifth Embodiment

In the process of describing the electronic apparatus in the embodiments described above, obviously, some processing or methods are disclosed. Hereinafter, an overview of the methods is given without repeating some details disclosed above. However, it should be noted that, although the methods are disclosed in a process of describing the electronic apparatus, the methods do not certainly employ or are not certainly executed by the aforementioned components. For example, the embodiments of the electronic apparatus may be partially or completely implemented with hardware and/or firmware. The methods for the electronic apparatus discussed below may be executed by a computer-executable program completely, although the hardware and/or firmware of the electronic apparatus can also be used in the methods.

Figure 9:
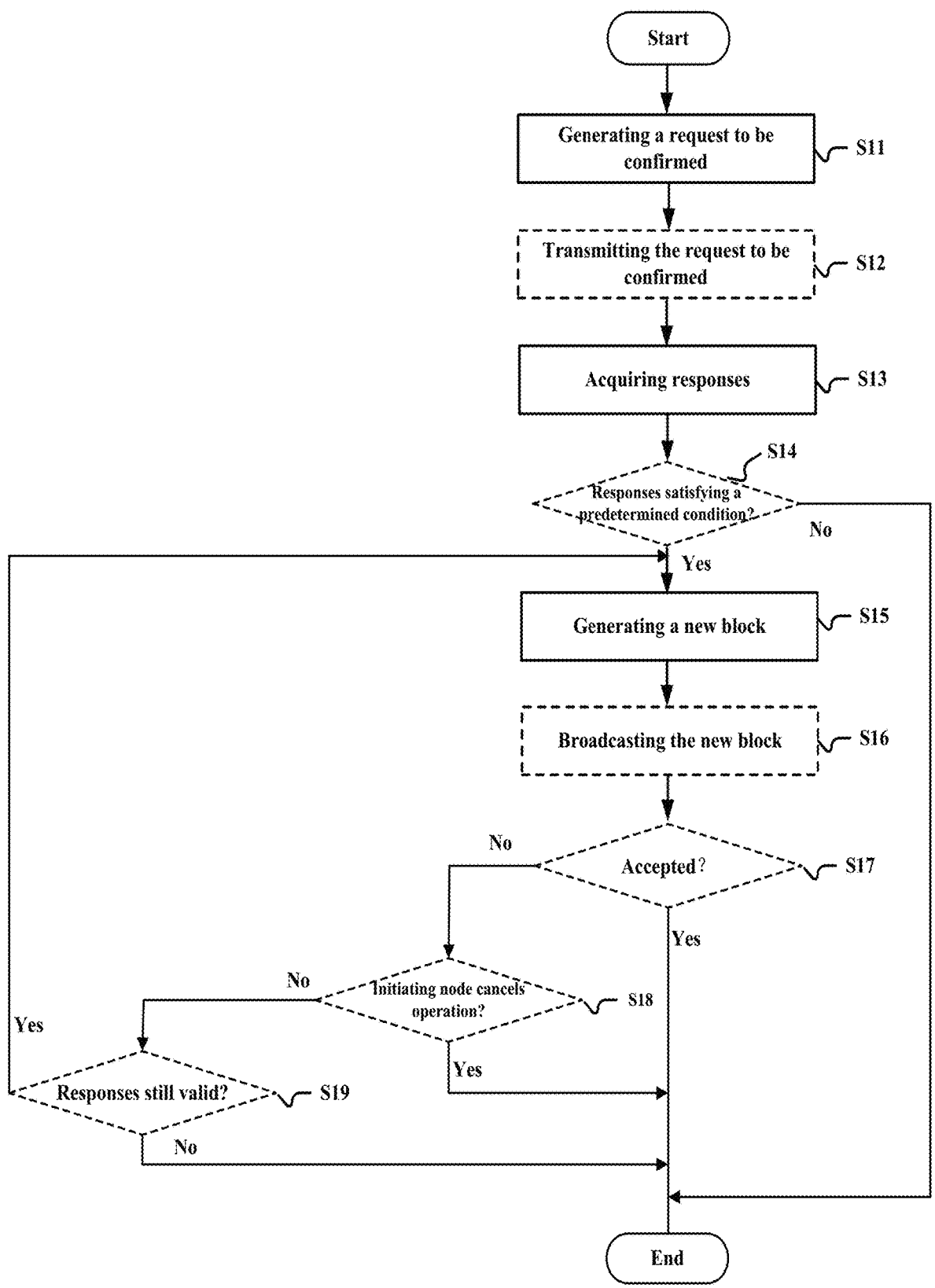
FIG. 9 shows a flowchart of a method for an electronic apparatus according to an embodiment of the present disclosure.

FIG. 9 shows a flowchart of a method for an electronic apparatus according to an embodiment of the present disclosure. The method includes: generating a request to be conformed which is to be sent to other nodes in a network (S11), where the request to be confirmed includes an electronic signature of the present node; acquiring responses to the request to be confirmed which are from the other nodes (S13), where the response includes an electronic signature of a corresponding node; and generating, based on the request to be confirmed, the acquired responses and an existing block chain, a new block (S15).

In addition, as shown by a dotted line block in FIG. 9, the method may further include step S12: transmitting the request to be confirmed to other nodes in the network.

In an example, before step S15, the method may further include step S14: judging whether the acquired responses satisfy a predetermined condition. Step S15 of generating a new block is performed only in the case that it is determined that the acquired responses satisfy the predetermined condition. The predetermined condition is configured according to an actual application scenario or requirements for example. The operation of acquiring responses in step S13 may be performed within a predetermined time window since the request to be confirmed is transmitted, for example.

Exemplarily, the responses may further include information of time limitation for indicating a period of time during which the responses are valid. The response is made by a corresponding node according to priori knowledge of the node or real-time context data.

The new block generated in step S15 may include a block header and a data body, and the block header includes a timestamp, a hash value of a last block in an existing block chain, a hash value of the new block and a hash value of the data body. The data body may include the request to be confirmed and the responses.

In another example, the block header may further include the request to be confirmed. Accordingly, the data body includes the responses. The information of the data body may be stored in a tree hash structure.

In addition, as shown by another dotted line block in FIG. 9, the method may further include step S16: broadcasting the generated new block to each of the other nodes in the network so as to update the block chain. In step S17, it is judged whether the new block broadcasted by the present node is accepted; and the method ends if it is determined that the new block is accepted. If it is determined that the new block is not accepted, in step S18, it is judged whether the initiating node has cancelled the operation of generating a new block. The method ends if it is determined in step S18 that the initiating node cancels the operation of generating the new block. If it is determined in step S18 that the initiating node has not cancelled the operation of generating the new block, in step 519, it is judged whether the information of the response is still valid. If it is determined in step S19 that the information of the response is still valid, the method returns to step S15 so as to regenerate a new block based on the request to be conformed, the received response and the already updated block chain. If it is determined in step S19 that the information of the response is not valid, the processing ends. Alternatively, if it is determined in step S19 that the information of the response is not valid, the method returns to step S11 to repeat all steps to generate a new block.

It should be understood that, the operations shown by the dotted line blocks in FIG. 9 are optional, which do not limit the processing of the method described above.

Figure 10:
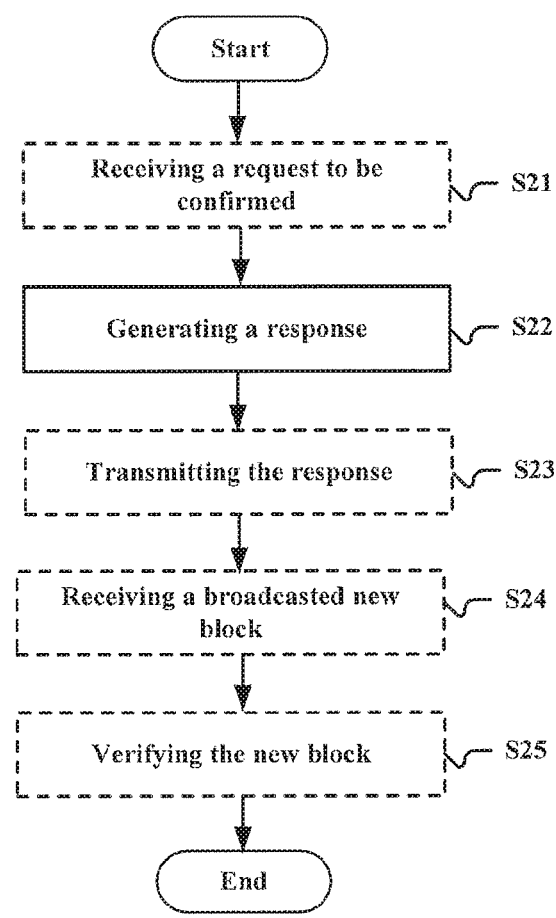
FIG. 10 shows a flowchart of a method for an electronic apparatus according to an embodiment of the present disclosure.

FIG. 10 shows a flowchart of a method for an electronic apparatus according to another embodiment of the present disclosure. The method includes: generating a response to a request to be confirmed from another node in a network (S22), for use by the other node to generate a new block, where the request to be confirmed includes an electronic signature of the other node and the response includes an electronic signature of the present node.

In addition, as shown by the dotted line blocks in FIG. 10, the method may further include: receiving the request to be confirmed (S21); and transmitting the generated response to the other node (S23).

In step S22, the response may be made according to priori knowledge of the present node or real-time context data. The response may include information of time limitation for indicating a period of time during which the response is valid.

The method may further include: receiving a new block broadcasted by another node (S24); and verifying the received new block and attaching the new block to the end of a copy of a block chain stored by the present node if the verification passes (S25).

In an example, in step S24, when two or more broadcasted new blocks are received simultaneously, the earliest generated new block is selected according to information of timestamps in the new blocks.

It should be noted that, the methods described above may be used in combination or separately, and details thereof are described in detail in the first embodiment to the fourth embodiment, which are not repeated here.

The basic principle of the present invention has been described above in conjunction with particular embodiments. However, as can be appreciated by those ordinarily skilled in the art, all or any of the steps or components of the method and device according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 1100 shown in FIG. 11) from a storage medium or network, wherein the computer is capable of implementing various functions when installed with various programs.

Figure 11:
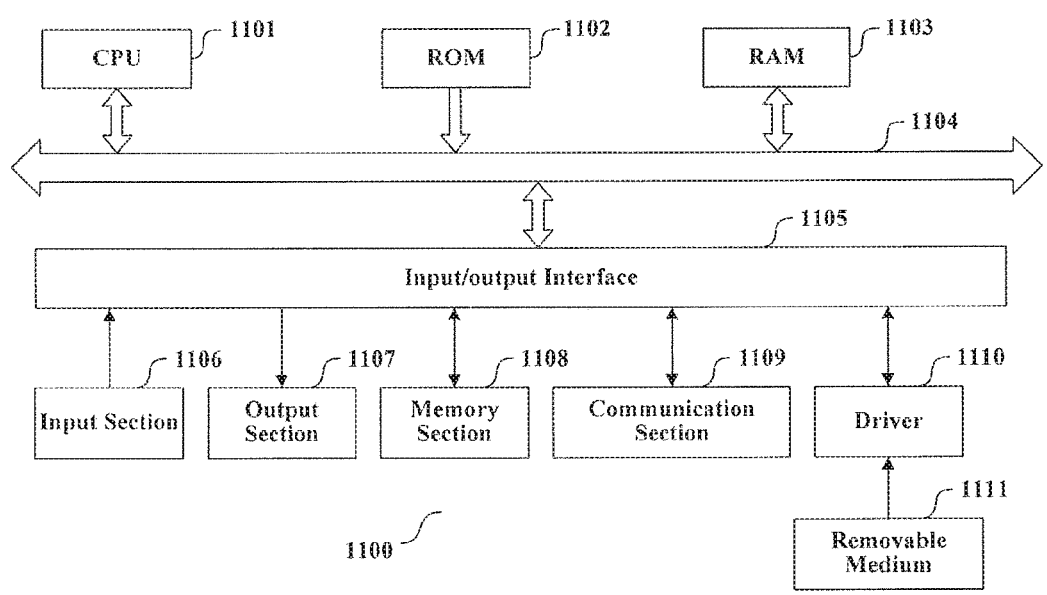
FIG. 11 is an exemplary block diagram illustrating the structure of a general purpose personal computer capable of realizing the method and/or device and/or system according to the embodiments of the present invention.

In FIG. 11, a central processing unit (CPU) 1101 executes various processing according to a program stored in a read-only memory (ROM) 1102 or a program loaded to a random access memory (RAM) 1103 from a memory section 1108. The data needed for the various processing of the CPU 1101 may be stored in the RAM 1103 as needed. The CPU 1101, the ROM 1102 and the RAM 1103 are linked with each other via a bus 1104. An input/output interface 1105 is also linked to the bus 1104.

The following components are linked to the input/output interface 1105: an input section 1106 (including keyboard, mouse and the like), an output section 1107 (including displays such as a cathode ray tube (CRT), a liquid crystal display (LCD), a loudspeaker and the like), a memory section 1108 (including hard disc and the like), and a communication section 1109 (including a network interface card such as a LAN card, modem and the like). The communication section 1109 performs communication processing via a network such as the Internet. A driver 1110 may also be linked to the input/output interface 1105. If needed, a removable medium 1111, for example, a magnetic disc, an optical disc, a magnetic optical disc, a semiconductor memory and the like, may be installed in the driver 1110, so that the computer program read therefrom is installed in the memory section 1108 as appropriate.

In the case where the foregoing series of processing is achieved by software, programs forming the software are installed from a network such as the Internet or a memory medium such as the removable medium 1111.

It should be appreciated by those skilled in the art that the memory medium is not limited to the removable medium 1111 shown in Figure, which has program stored therein and is distributed separately from the apparatus so as to provide the programs to users. The removable medium 1111 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1102 and the memory section 1108 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent schemes of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. An electronic apparatus, comprising:
a processing circuit configured to:
generate a confirmation request to be sent from the electronic apparatus to other nodes in a vehicle-to-vehicle network, the confirmation request comprising an electronic signature of the electronic apparatus as a present node;
acquire responses to the confirmation request sent from the other nodes, the acquired responses respectively comprising an electronic signature of a corresponding node that generated the response; and
generate a new block, based on
the confirmation request,
the acquired responses from the other nodes, and
an existing block chain, wherein
the confirmation request comprises geographical location information and traffic conditions information at a corresponding geographical location of the electronic apparatus.

2. The electronic apparatus according to claim 1, wherein the processing circuit is further configured to generate the new block only when the acquired responses satisfy a predetermined condition.

3. The electronic apparatus according to claim 1, wherein the new block comprises a block header and a data body, and the block header comprises a timestamp, a hash value of a last block in the existing block chain, a hash value of the new block and a hash value of the data body.

4. The electronic apparatus according to claim 3, wherein the block header further comprises the confirmation request.

5. The electronic apparatus according to claim 3, wherein the data body comprises the confirmation request and the acquired responses.

6. The electronic apparatus according to claim 4, wherein the data body comprises the responses.

7. The electronic apparatus according to claim 3, wherein information of the data body is stored in a tree hash structure.

8. The electronic apparatus according claim 1, wherein the responses further comprise information of time limitation, for indicating a period of time during which the responses are valid.

9. The electronic apparatus according to claim 1, wherein each response is made by the corresponding node that generated the response according to a priori knowledge of the electronic apparatus or real-time context data.

10. The electronic apparatus according to claim 1, further comprising:
a transceiving circuit, configured to broadcast the generated new block to each of the other nodes in the network to update the block chain.

11. The electronic apparatus according to claim 10, wherein the processing circuit is further configured to respond to a rejection of the generated new block by the other nodes by regenerating a new block based on the confirmation request, the acquired responses and an updated block chain.

12. The electronic apparatus according to claim 11, wherein the processing circuit is further configured to stop regeneration of the new block when the information of the responses is no longer valid.

13. The electronic apparatus according to claim 10, wherein the transceiving circuit is further configured to receive the acquired responses within a predetermined time period since the confirmation request is transmitted.

14. The electronic apparatus according to claim 1, wherein the vehicle to vehicle network is Internet of Vehicle.

15. An electronic apparatus, comprising:
a processing circuit configured to:
generate a response to a confirmation request from an other node in a vehicle-to-vehicle network, for use by the other node to generate a new block based on:
the confirmation request from the other node,
the generated response, and
an existing block chain,
wherein the confirmation request comprises an electronic signature of the other node, and the response comprises an electronic signature of the electronic apparatus as the present node,
wherein the confirmation request comprises geographical location information and traffic conditions information at a corresponding geographical location of the electronic apparatus.

16. The electronic apparatus according to claim 15, further comprising:
a transceiving circuit, configured to receive the confirmation request and transmit the generated response to the other node.

17. The electronic apparatus according to claim 16, wherein the transceiving circuit is further configured to receive a new block broadcasted by another node, and the processing circuit is further configured to verify the received new block and attach the new block to the end of a copy of a block chain stored by the present node after the verification passes.

18. The electronic apparatus according to claim 17, wherein the processing circuit is configured to, in the case that the transceiving circuit receives two or more broadcasted new blocks at the same time, select the earliest generated new block according to information of timestamps in the new blocks.

19. The electronic apparatus according to claim 15, wherein the processing circuit is configured to generate the response according to a priori knowledge of the present node or real-time context data.

20. The electronic apparatus according to claim 15, wherein the response further comprises information of time limitation, for indicating a period of time during which the response is valid.

21. A method for an electronic apparatus, comprising:
generating a confirmation request which is to be sent from the electronic apparatus to other nodes in a vehicle-to-vehicle network, the confirmation request comprising an electronic signature of the electronic apparatus as a present node;
acquiring responses to the confirmation request which are sent from the other nodes, the acquired responses respectively comprising an electronic signature of a corresponding node that generates the response; and generating a new block, based on
the confirmation request,
the acquired responses from the other nodes, and
an existing block chain, wherein
the confirmation request comprises geographical location information and traffic conditions information at a corresponding geographical location of the electronic apparatus.

22. A non-transitory computer readable storage medium having computer readable instructions that when executed by a processor perform a method, the method comprising:

generating a confirmation request which is to be sent from the electronic apparatus to other nodes in a vehicle-to-vehicle network, the confirmation request comprising an electronic signature of the electronic apparatus as a present node;

acquiring responses to the confirmation request which are sent from the other nodes, the acquired responses respectively comprising an electronic signature of a corresponding node that generates the response; and generating a new block, based on
the confirmation request,
the acquired responses from the other nodes, and
an existing block chain, wherein the confirmation request comprises geographical location information and traffic conditions information at a corresponding geographical location of the electronic apparatus.

* * * * *